(12) United States Patent
Chapman et al.

(10) Patent No.: US 8,411,214 B2
(45) Date of Patent: Apr. 2, 2013

(54) VARIABLY TRANSMITTIVE, ELECTRONICALLY-CONTROLLED EYEWEAR

(75) Inventors: John J. Chapman, Cardinal, VA (US); Louis J. Glaab, Hampton, VA (US); Timothy D. Schott, Hampton, VA (US); Charles T. Howell, Newport News, VA (US); Vincent J. Fleck, Tabb, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1317 days.

(21) Appl. No.: 12/144,937

(22) Filed: Jun. 24, 2008

(65) Prior Publication Data

US 2009/0317773 A1    Dec. 24, 2009

(51) Int. Cl.
*G02F 1/1335*    (2006.01)
(52) U.S. Cl. ............................................ 349/13; 434/36
(58) Field of Classification Search .................... 349/13, 349/74, 96, 117, 86, 61, 88; 434/36, 41; 359/245; 362/612
See application file for complete search history.

(56) References Cited

U.S. PATENT DOCUMENTS

| | | | |
|---|---|---|---|
| 4,973,149 A | 11/1990 | Hutchinson | |
| 5,819,207 A * | 10/1998 | Takagi | 702/153 |
| 5,861,936 A | 1/1999 | Sorensen | |
| 6,028,656 A | 2/2000 | Buhrer et al. | |
| 6,091,546 A * | 7/2000 | Spitzer | 359/618 |
| 6,299,308 B1 | 10/2001 | Voronka et al. | |
| 6,932,090 B1 * | 8/2005 | Reschke et al. | 128/898 |
| 6,943,852 B2 | 9/2005 | Divelbiss et al. | |
| 6,959,102 B2 | 10/2005 | Peck | |
| 7,079,203 B1 * | 7/2006 | Huang et al. | 349/95 |
| 8,045,097 B2 * | 10/2011 | Sakai et al. | 349/74 |

* cited by examiner

*Primary Examiner* — Thoi Duong
(74) *Attorney, Agent, or Firm* — Andrea Z. Warmbier; Helen M. Galus

(57) ABSTRACT

A system and method for flight training and evaluation of pilots comprises electronically activated vision restriction glasses that detect the pilot's head position and automatically darken and restrict the pilot's ability to see through the front and side windscreens when the pilot-in-training attempts to see out the windscreen. Thus, the pilot-in-training sees only within the aircraft cockpit, forcing him or her to fly by instruments in the most restricted operational mode.

21 Claims, 4 Drawing Sheets

VARIABLY TRANSMITTIVE, ELECTRONICALLY-CONTROLLED EYEWEAR

FIELD OF THE INVENTION

The present invention generally relates to electronically-controlled eyewear of variable transmittivity and, more particularly, relates to eyewear capable of selectively obscuring a user's vision for training, eye protection, and the like.

BACKGROUND OF THE INVENTION

Pilots require or benefit from instrument-only training in order to prepare for poor visibility conditions or in-air emergencies. Specific pilot training and evaluation procedures for instrument flight rating qualification currently involves the use of an opaque hood draped across an aircraft's wind screen to restrict or obscure the student pilot's vision during instrument-only flight sessions. Another alternative training technique is the use of a face mask worn by the pilot in training which greatly restricts the pilot's peripheral vision but also prevents the pilot from seeing the entire instrument panel without moving his or her head. There is a potential for disorientation by the use of such training techniques that otherwise complicates the task of instrument flight training. There is a need for a training technique that is effective in restricting the pilot's field of view while providing a more realistic and safer training experience. Ideally, the apparatus used for an improved training experience would also protect military or commercial pilots from hostile laser impingement into a cockpit.

BRIEF SUMMARY OF THE INVENTION

In one embodiment of the invention, a system for selectively obscuring a user's vision comprises a head position detection element for detecting a position of the user's head, eyewear having variably transmittive lenses, and a controller. The controller is configured to receive user head position information from the head position detection element and to control the transmittivity of the lenses based on the user head position information by varying an electrical signal applied to the lenses. The user head position information may comprise information regarding an up and down position of the user's head relative to a predetermined point in space in front of the user. As such, the controller may be configured to reduce the transmittivity to darken the lenses and thereby obscure the user's vision when the user's up and down head position is above the predetermined point in space, and to increase the transmittivity to lighten the lenses and thereby not obscure the user's vision when the user's up and down head position is below the predetermined point in space. The predetermined point in space may be at a border between a windscreen and an instrument panel of an aircraft. The controller may be configured to control the transmittivity of the lenses by varying at least one of an amplitude or a duty cycle of the electrical signal applied to the lenses.

Additionally, the user head position information may comprise information regarding a left and right position of the user's head relative to a predetermined point in space in front of the user. As such, the controller may be configured to reduce the transmittivity to darken the lenses and thereby obscure the user's vision when the user's left and right head position is more than a predetermined distance from the predetermined point in space.

The head position detection element may comprise at least one near-infrared light emitting diode and an associated collimated detector mounted on the user's head. In one specific embodiment, the head position detection element comprises three near-infrared light emitting diodes, such that one light emitting diode is mounted in front of the user to detect an up and down position of the user's head and one light emitting diode is mounted on each side of the user to detect a left and right position of the user's head.

The system may further comprise a gaze direction detection element for detecting a direction of the user's gaze. In such an embodiment, the controller is further configured to receive user gaze direction information from the gaze direction detection element and to control the transmittivity of the lenses based on the user head position information and the gaze direction information.

The system may be further configured to receive aircraft altitude information and to increase the transmittivity to lighten the lenses and thereby not obscure the user's vision when the aircraft altitude information indicates that the aircraft is below a predetermined altitude.

Each variably transmittive lens may comprise two stacked variable attenuation optical cells sandwiching a half-wave plate. Each optical cell may comprise (1) a transparent substrate, (2) an optically transparent electrically conductive layer on the substrate, (3) a transmissive type twisted nematic liquid crystal polymer layer on the electrically conductive layer, (4) a first linear polarization layer on the substrate opposite the electrically conductive layer, and (5) a second linear polarization layer on the liquid crystal polymer layer, the second polarization layer having a transmission axis oriented 90 degrees apart from a transmission axis of the first polarization layer.

In addition to the system for selectively obscuring a user's vision, as described above, other aspects of the present invention are directed to corresponding methods of selectively obscuring a user's vision.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The novel flight subsystem of embodiments of the invention performs the function of an "electronic hood" and is worn like glasses or goggles. The pilot eyewear of embodiments of the invention integrates variable opacity optical elements into comfortable glasses, goggles, or any suitable eyewear. This has been accomplished through the use of custom lens structures employing a transmissive-type twisted nematic liquid crystal polymer layer as an electro-active layer.

In at least one embodiment, the lens darkening system uses battery powered near infrared light emitting diode (LED) sources mounted in the cockpit of an aircraft to provide a solid angle cone of invisible light which functions to determine pilot head position. The infrared source and detection system responds to the pilot-in-training head up/down position, allowing the pilot to always see the cockpit-mounted tactical and strategic displays but restricting that pilot's vision out of the windscreen and/or (optionally) side windows. The instructor pilot does not wear the vision restrictive glasses to ensure flight safety. In one embodiment, a controller, linked to the aircraft flight computer or altimeter, commands the lenses to become clear when the test pilot looks through the windscreen when the aircraft is below 200 feet altitude on final approach, enabling the pilot to safely maneuver the aircraft to touchdown. In an alternate embodiment, the infrared source receives the altitude information directly from the altimeter or flight computer and the infrared source stops emitting (thereby causing the lenses to become clear) when the aircraft is below 200 feet altitude on final approach. A goal of the invention is to provide a system and method to enable pilots in instrument training to become proficient with instrument metrological conditions or flying solely by cockpit instruments. Another goal is to provide a wearable variable vision restriction system which can simulate variable visibility conditions corresponding to various metrological conditions such as clouds, rain, fog, smoke, haze, night time darkness levels, or clear skies. This second goal may be accomplished by selective variation of the lens darkening schemes (such as by varying duty cycle, excitation frequency, and amplitude of the lens control signal) combined with selective light scattering mechanisms as additive lens elements.

Figure 1:
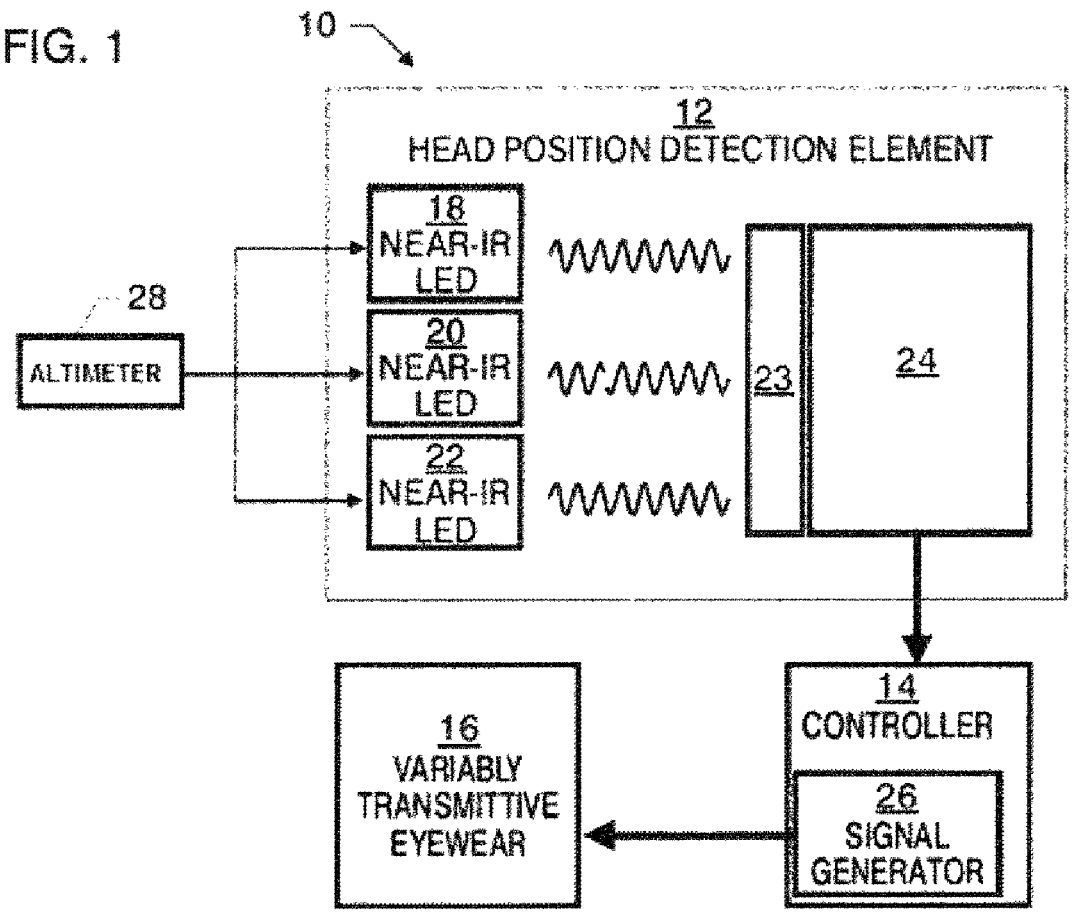
FIG. 1 is block diagram of a system for selectively obscuring a user's vision, in accordance with one embodiment of the invention.

FIG. 1 is block diagram of a system for selectively obscuring a user's vision, in accordance with one embodiment of the invention. Such a system may be used to restrict or obscure a student pilot's vision during instrument-only flight sessions. The system 10 comprises a head position detection element 12 for detecting a position of the user's head, eyewear 16 having variably transmittive lenses, and a controller 14. The controller is configured to receive user head position information from the head position detection element and to control the transmittivity of the lenses based on the user head position information by varying an electrical signal applied to the lenses. The head position detection element 12 may comprise one or more near-infrared light emitting diodes and an associated detector 24 mounted on the user's head (e.g., on a helmet worn by the user). In one specific embodiment, the head position detection element comprises three near-infrared light emitting diodes, such that one light emitting diode 18 is mounted in front of the user to detect an up and down position of the user's head and one light emitting diode is mounted on each side of the user to detect a right (20) and left (22) position of the user's head. A collimator 23 is positioned adjacent the detector 24 such that the infrared light from the LEDs passes through the collimator before being received by the detector (i.e., the detector is "looking through" the collimator at the LEDs). As the LEDs emit an uncollimated "cone" of light, the collimator enables the detector to have a limited field of view that provides angularity in the detection to enable the head position to be determined. For purposes of this application, the combination of the collimator and the detector will be termed a "collimated detector." The controller 14 typically controls the transmittivity of the lenses by varying the amplitude or duty cycle of the electrical signal applied to the lenses, such as via signal generator 26.

In one embodiment, the Infrared (IR) sources (LEDs 18, 20, 22) receive altitude information, such as from altimeter 28. This altitude information enables the IR sources to cease emitting, thereby lightening the lenses and not obscuring the user's vision when the aircraft altitude information indicates that the aircraft is below a predetermined altitude (e.g., 200 feet). In an alternate embodiment, the controller 14 may receive the aircraft altitude information, such as from altimeter 28, and cease applying the signal to the lenses.

Figure 2:
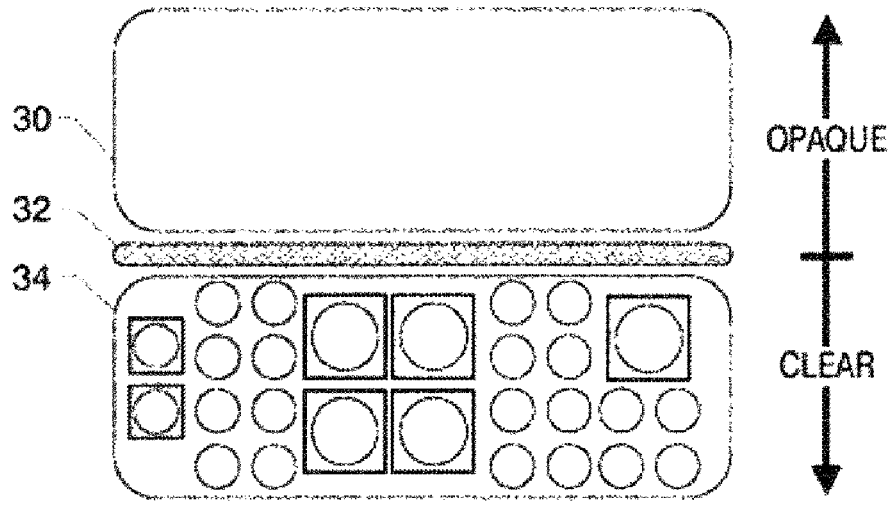
FIGS. 2-4 illustrate the operation of the system of FIG. 1.
Figure 3A:
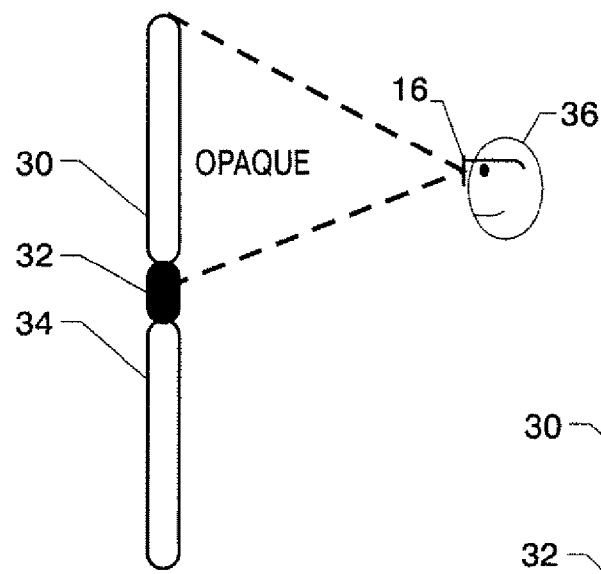
Figure 3B:
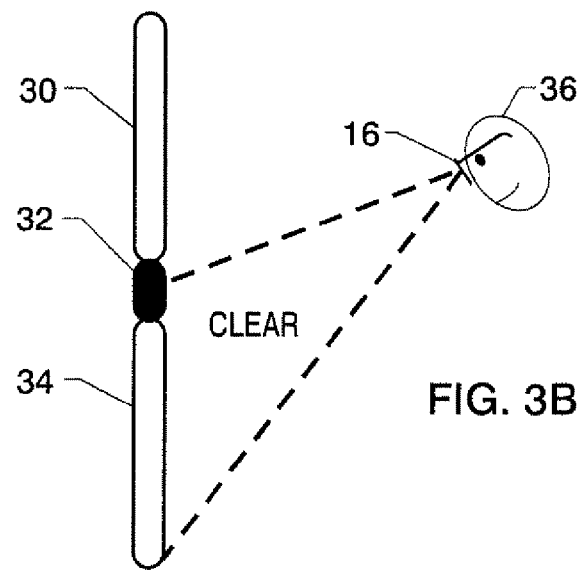
Figure 4:
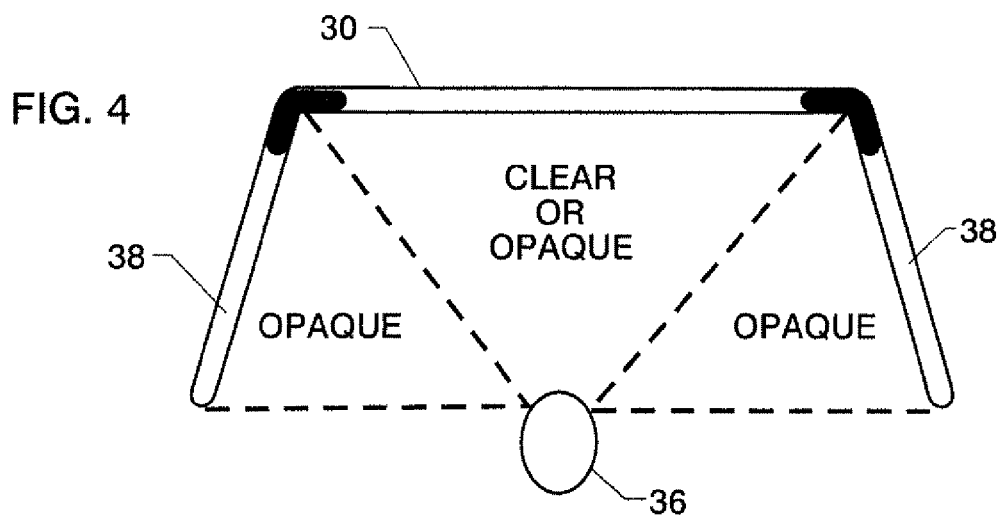

FIGS. 2-4 illustrate the operation of the system of FIG. 1 in for pilot training in an aircraft. The user head position information from the head position detection element typically comprises at least information regarding the up/down position of the user's head relative to a predetermined point in space in front of the user. As such, the controller may be configured to reduce the transmittivity to darken the lenses and thereby obscure the user's vision when the user's up and down head position is above the predetermined point in space, and to increase the transmittivity to lighten the lenses and thereby not obscure the user's vision when the user's up and down head position is below the predetermined point in space. In one embodiment, the invention allows the pilot to always see the cockpit-mounted tactical and strategic displays (which may be termed the "instrument panel") but restricting that pilot's vision out of the windscreen and/or (optionally) side windows. In such an embodiment, the predetermined point in space is at the border between the windscreen and the instrument panel (i.e., at the "dashboard"). This is illustrated in FIGS. 2, 3A and 3B. FIG. 2 illustrates a pilot's view of a windscreen 30, a dashboard 32, and an instrument panel 34 of an aircraft. As illustrated in FIG. 2, when the pilot's head position indicates that the pilot is attempting to look out the windscreen 30, the lenses of the variably transmittive eyewear become opaque. Conversely, when the pilot's head position indicates that the pilot is attempting to look at the instrument panel 34, the lenses of the variably transmittive eyewear become clear. FIGS. 3A and 3B illustrate a side view of a pilot 36 wearing the variably transmittive eyewear 16. As seen in FIG. 3A, when the pilot's head position indicates that the pilot is attempting to look out the windscreen 30, the lenses of the variably transmittive eyewear become opaque. Conversely, as seen in FIG. 3B, when the pilot's head position indicates that the pilot is attempting to look at the instrument panel 34, the lenses of the variably transmittive eyewear become clear.

In addition to the up/down position of the pilot's head, the user head position information may comprise information regarding the left/right position of the user's head relative to a predetermined point in space in front of the user. As such, the controller may be configured to reduce the transmittivity to darken the lenses and thereby obscure the user's vision when the user's left and right head position is more than a predetermined distance from the predetermined point in space. This is illustrated in FIG. 4. FIG. 4 illustrates a top view of a pilot within an aircraft cockpit. As illustrated in FIG. 4, when the pilot's head position indicates that the pilot 36 is attempting to look out either of the side windows 38, the lenses of the variably transmittive eyewear become opaque. When the pilot's head position indicates that the pilot is looking forward, the up/down position information determines whether the eyewear is opaque or clear.

Although not illustrated in the figures, the system may comprise a gaze direction detection element for detecting a direction of the user's gaze. In such an embodiment, the controller is further configured to receive user gaze direction information from the gaze direction detection element and to control the transmittivity of the lenses based on the user head position information and the gaze direction information.

Figure 5A:
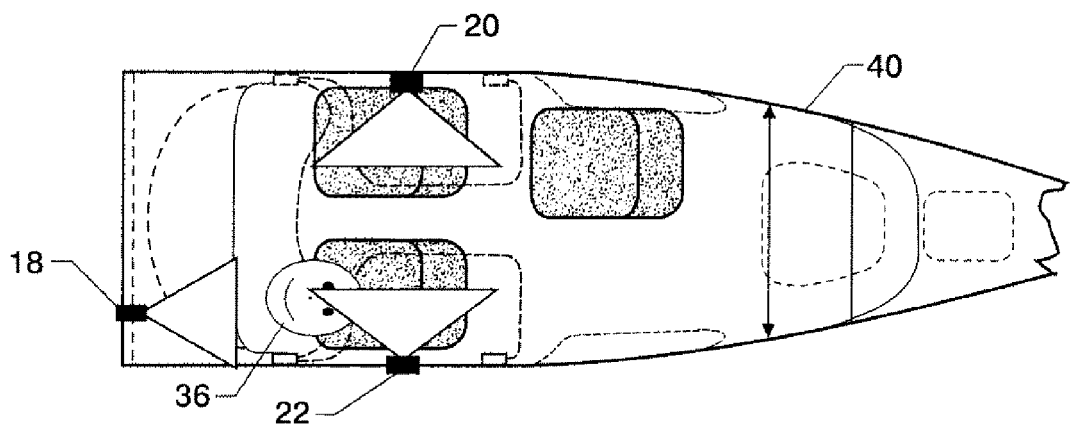
FIGS. 5A and 5B illustrate the location of LED receivers in an aircraft, in accordance with one embodiment of the invention.
Figure 5B:
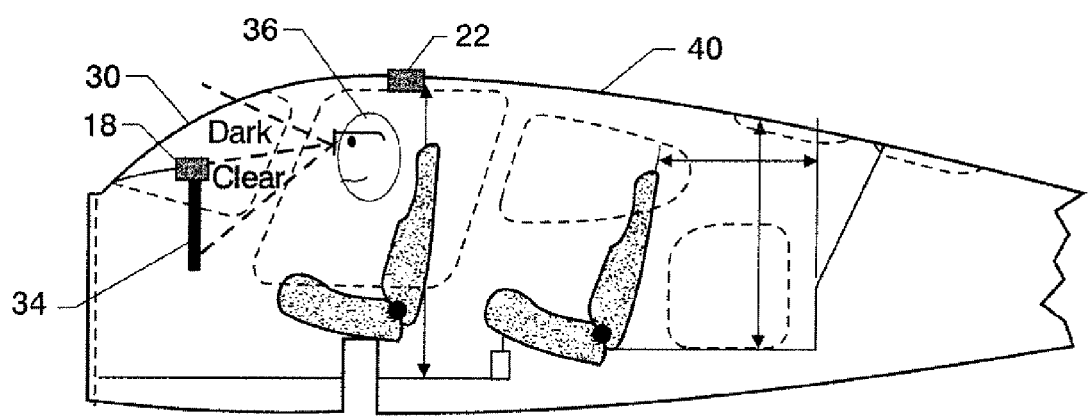

FIGS. 5A and 5B illustrate the location of LED receivers in an aircraft 40, in accordance with one embodiment of the invention. FIG. 5A is a top view and FIG. 5B is a side view. As can be seen in FIG. 5A, three near-infrared light emitting diodes may be used, such that one light emitting diode 18 is mounted in front of the user to detect an up and down position of the user's head 36 and one light emitting diode is mounted on each side of the user to detect a right (20) and left (22) position of the user's head. As seen in FIG. 5A, the LEDs provide a solid angle cone of invisible light which functions to determine pilot head position. As can be seen in FIG. 5B, the front LED 18 is typically mounted on the aircraft dashboard and the side LEDs are typically mounted above each side window (the left side LED is illustrated in FIG. 5B). FIG. 5B also again illustrates that, when the pilot's head position indicates that the pilot is attempting to look out the windscreen 30, the lenses of the variably transmittive eyewear become opaque. Conversely, when the pilot's head position indicates that the pilot is attempting to look at the instrument panel 34, the lenses of the variably transmittive eyewear become clear.

Figure 6:
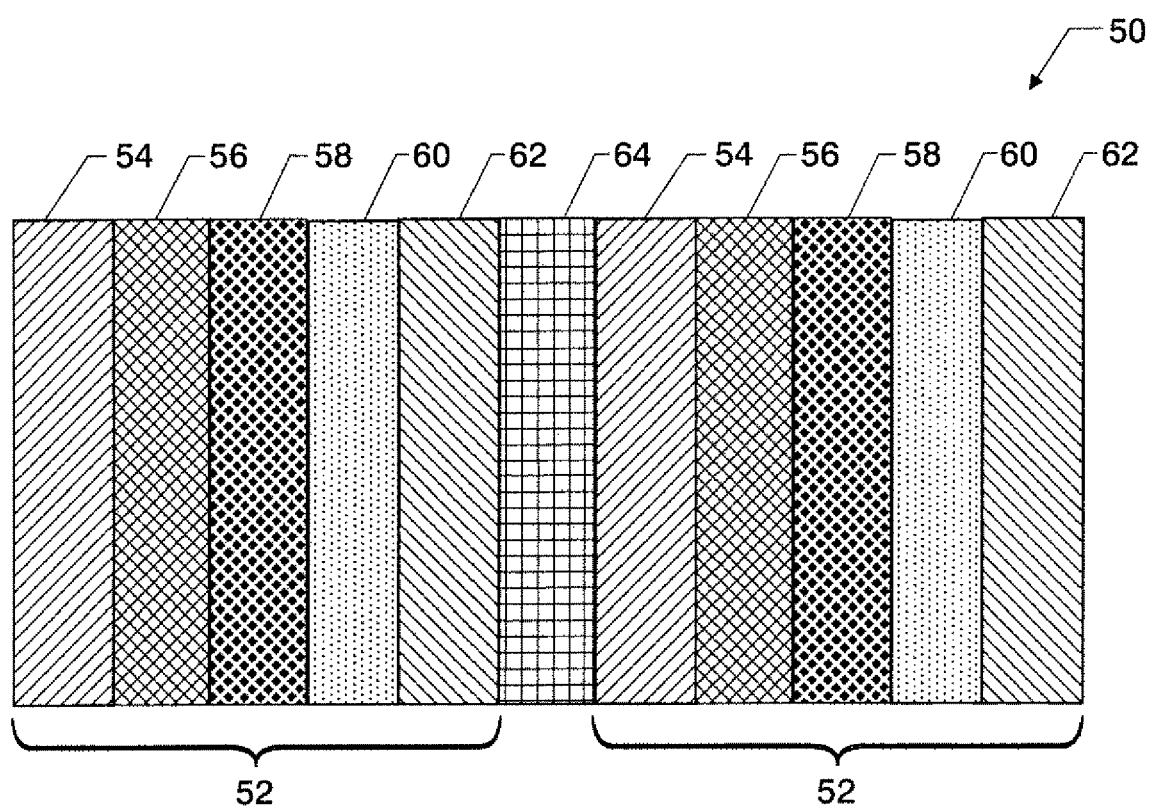
FIG. 6 illustrates the structure of a lens of variably transmittive eyewear, in accordance with one embodiment of the invention.

FIG. 6 is a not-to-scale cross section of a lens of variably transmittive eyewear, illustrating the structure of the lens, in accordance with one embodiment of the invention. Each variably transmittive lens 50 typically comprises two stacked variable attenuation optical cells 52 sandwiching a half-wave plate 64. Each optical cell 52 may comprise a transparent substrate 60, an optically transparent electrically conductive layer 58 on the substrate, a transmissive type twisted nematic liquid crystal polymer layer 56 on the electrically conductive layer, a first linear polarization layer 62 on the substrate opposite the electrically conductive layer, and a second linear polarization layer 54 on the liquid crystal polymer layer. The second polarization layer 54 has a transmission axis oriented 90 degrees apart from a transmission axis of the first polarization layer 62.

In at least one embodiment a 4-6 micron thickness nematic layer 56 is deposited upon a transparent substrate 60 that is coated with optically transparent indium tin oxide (ITO). The ITO electrically conductive layer 58 acts to provide a uniform electric field in the region between substrates such that the electric field is perpendicular to the substrates and is also coated with a thin variable rotation optical element layer. Lens elements ideally comprise optical grade polycarbonate (but glass also works) as substrate material.

The above described layered lenses serve to accomplish variable light transmission operating as an electro-optical Kerr cell over the visible band (270 nanometer (nm) bandwidth centered on 560 nm) when a sufficiently large electric field is applied to the ITO layers. Inside the helically oriented birefringent nematic crystal layer, propagating light is described by two elliptically polarized Eigen modes (which follows the Mauguin limit where d times delta n is much greater than Phi times lambda divided by pi (where Phi=the twist angle of the liquid crystal layer, d=layer thickness, delta n=birefringence of the liquid crystal, and lambda=center wavelength (about 560 nm))). Light rays become linearly polarized photons which follow the nematic helix structure resulting in wave-guiding. Thus by application of an electric field to the ITO layer, the degree of rotation of the nematic crystal can be controlled, which in turn controls the transmission of light through the combined layers. The layers act as electro-optical attenuation cells by effectively rotating the polarization axis of light exiting the first linear polarization layer such that it will also pass through the second linear polarization layer. Thus the transmission characteristics may be controlled by an applied electric field of sufficient amplitude to rotate the nematic crystal. The ratio of light transmission through one cell can achieve as much as 500:1 extinction ratio with proper excitation.

Stacking two such variable attenuation cells in sequential optical path with a half-wave plate (with matching optical transmission characteristics, e.g., 270 nm bandwidth centered on 560 nm) positioned in plane parallel fashion results in transmission characteristics dependent upon the orientation of the fast axis of the half-wave plate relative to the transmission axis of the linear polarizers on either side of the half-wave plate. Two such layered structures serve as left and right "unbreakable" lens elements (i.e., considerably more break-resistant than glass of same (approx. 0.7 millimeter) thickness) when integrated into a wearable frame with earpieces to be worn like sunglasses. The laminated polarizing films also serve to protect the wearer's eye(s) in the event of accidental lens breakage due to impact.

A driver circuit output (such as from signal generator 26) is normally a square wave of 6 to 12 volts amplitude applied directly to the ITO layers, but additional rectification and driving the two lens elements in parallel by use of a selective switching matrix greatly increases the extinction ratio. The electrical connection between the driver circuit outputs and the ITO lens elements (both can be located within the glasses frames) is typically accomplished using interconnecting wires positioned with conductive elastomeric strips in contact with the ITO surfaces. Overall light transmission/attenuation through each combined lens element is controlled by variation of the amplitude of excitation voltage as well as the duty cycle applied to the ITO layers. The overall transmission of light through two "stacked" lens cells without excitation is determined by setting the exact angle of the half-wave plates to allow an equivalent amount of light to equal the desired neutral density filter. The equivalent neutral density filter transmission characteristics can be calibrated by comparison with a fixed neutral density filter. The left lens elements dynamic and static light transmission characteristics are typically matched to the right lens elements characteristics to prevent disorientation of the wearer.

One specific embodiment of the invention has the following specifications:
  substrate material: optical grade polycarbonate
  optical blank dimensions: 4 centimeter (height)×6 centimeter (width)
  metallization layer: indium tin oxide
  transparent, conductive layer deposited over polycarbonate.
  retarder material; nematic liquid (bi-refringent polymer) crystal
  polarizing material: dichroic polymer
  wavelength: wideband 450 to 700 nanometers transmission
  polychromatic with bandpass centered on 560 nm
  "gray" or "green" lens appearance
  beam divergence: 2 arc minutes
  distortion: ¼ wavelength
  transmittance: Clear mode=75% with unpolarized input
  lower transmission values obtained by rotation of lens element layers to approximate dark neutral filter (ND=4) has been determined optimal for full sunlight in cockpit contrast on/off attenuation: currently around 500:1 per layer
voltage level for transition: 8 to 15 volts
15 volts applied to two lens elements (positioned serially in optical path) results in 1000:1 attenuation ratio
LED power supply: coin cell lithium batteries
circuitry: flexible detector/driver card in glasses frames
standard PC board for Infrared LED drivers
switching (transparent to dark) time: 1 millisecond
temperature range: 10 to 50 degrees Centigrade With minor modifications, such as using an instantly acting (10 millisecond to extinction) optical attenuation cell integrated into eyewear, embodiments of the invention may be capable of protecting a pilot's eyes by detection and attenuation of hostile laser impingement.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desired to be secured by Letters Patent of the United States is:

1. A system for selectively obscuring a user's vision, the system comprising:
    a head position detection element for detecting a position of the user's head;
    eyewear having variably transmittive lenses; and
    a controller configured to receive user head position information from the head position detection element comprising information regarding an up and down position of the user's head relative to a predetermined point in space in front of the user and further configured to control the transmittivity of the lenses based on the user head position information by varying an electrical signal applied to the lenses, wherein the controller is configured to reduce the transmittivity to darken the lenses and thereby obscure the user's vision when the user's up and down head position is above the predetermined point in space, and wherein the controller is configured to increase the transmittivity to lighten the lenses and thereby not obscure the user's vision when the user's up and down head position is below the predetermined point in space.

2. The system of claim 1, wherein the predetermined point in space is at a border between a windscreen and an instrument panel of an aircraft.

3. The system of claim 1, further comprising:
    a gaze direction detection element for detecting a direction of the user's gaze;
    wherein the controller is further configured to receive user gaze direction information from the gaze direction detection element and further configured to control the transmittivity of the lenses based on the user head position information and the gaze direction information.

4. The system of claim 1, wherein the controller is configured to control the transmittivity of the lenses by varying at least one of an amplitude or a duty cycle of the electrical signal applied to the lenses.

5. The system of claim 1, wherein each variably transmittive lens comprises two stacked variable attenuation optical cells sandwiching a half-wave plate, and
    wherein each optical cell comprises (1) a transparent substrate, (2) an optically transparent electrically conductive layer on the substrate, (3) a transmissive type twisted nematic liquid crystal polymer layer on the electrically conductive layer, (4) a first linear polarization layer on the substrate opposite the electrically conductive layer, and (5) a second linear polarization layer on the liquid crystal polymer layer, the second polarization layer having a transmission axis oriented 90 degrees apart from a transmission axis of the first polarization layer.

6. The system of claim 1, wherein the system is further configured to receive aircraft altitude information and wherein the system is configured to increase the transmittivity to lighten the lenses and thereby not obscure the user's vision when the aircraft altitude information indicates that the aircraft is below a predetermined altitude.

7. A system for selectively obscuring a user's vision, the system comprising:
    a head position detection element for detecting a position of the user's head;
    eyewear having variably transmittive lenses; and
    a controller configured to receive user head position information from the head position detection element comprising information regarding a left and right position of the user's head relative to a predetermined point in space in front of the user and further configured to control the transmittivity of the lenses based on the user head position information by varying an electrical signal applied to the lenses, wherein the controller is configured to reduce the transmittivity to darken the lenses and thereby obscure the user's vision when the user's left and right head position is more than a predetermined distance from the predetermined point in space.

8. The system of claim 7, wherein the system is further configured to receive aircraft altitude information and wherein the system is configured to increase the transmittivity to lighten the lenses and thereby not obscure the user's vision when the aircraft altitude information indicates that the aircraft is below a predetermined altitude.

9. The system of claim 7, wherein the predetermined point in space is at a border between a windscreen and an instrument panel of an aircraft.

10. The system of claim 7, further comprising:
    a gaze direction detection element for detecting a direction of the user's gaze;
    wherein the controller is further configured to receive user gaze direction information from the gaze direction detection element and further configured to control the transmittivity of the lenses based on the user head position information and the gaze direction information.

11. The system of claim 7, wherein each variably transmittive lens comprises two stacked variable attenuation optical cells sandwiching a half-wave plate, and
    wherein each optical cell comprises (1) a transparent substrate, (2) an optically transparent electrically conductive layer on the substrate, (3) a transmissive type twisted nematic liquid crystal polymer layer on the electrically conductive layer, (4) a first linear polarization layer on the substrate opposite the electrically conductive layer, and (5) a second linear polarization layer on the liquid crystal polymer layer, the second polarization layer having a transmission axis oriented 90 degrees apart from a transmission axis of the first polarization layer.

12. The system of claim 7, wherein the controller is configured to control the transmittivity of the lenses by varying at least one of an amplitude or a duty cycle of the electrical signal applied to the lenses.

13. A system for selectively obscuring a user's vision, the system comprising:
    a head position detection element for detecting a position of the users head, wherein the head position detection element comprises three near-infrared light emitting diodes, wherein one light emitting diode is mounted in front of the user to detect an up and down position of the user's head and one light emitting diode is mounted on each side of the user to detect a left and right position of the user's head and further comprises an associated collimated detector mounted on the user's head;
    eyewear having variably transmittive lenses; and
    a controller configured to receive user head position information from the head position detection element comprising information regarding an up and down position of the user's head relative to a predetermined point in space in front of the user and further configured to control the transmittivity of the lenses based on the user head position information by varying an electrical signal applied to the lenses.

14. The system of claim 13, wherein the system is further configured to receive aircraft altitude information and wherein the system is configured to increase the transmittivity to lighten the lenses and thereby not obscure the user's vision when the aircraft altitude information indicates that the aircraft is below a predetermined altitude.

15. The system of claim 13, wherein the predetermined point in space is at a border between a windscreen and an instrument panel of an aircraft.

16. The system of claim 13, further comprising:
    a gaze direction detection element for detecting a direction of the user's gaze;
    wherein the controller is further configured to receive user gaze direction information from the gaze direction detection element and further configured to control the transmittivity of the lenses based on the user head position information and the gaze direction information.

17. The system of claim 13, wherein each variably transmittive lens comprises two stacked variable attenuation optical cells sandwiching a half-wave plate, and
    wherein each optical cell comprises (1) a transparent substrate, (2) an optically transparent electrically conductive layer on the substrate, (3) a transmissive type twisted nematic liquid crystal polymer layer on the electrically conductive layer, (4) a first linear polarization layer on the substrate opposite the electrically conductive layer, and (5) a second linear polarization layer on the liquid crystal polymer layer, the second polarization layer having a transmission axis oriented 90 degrees apart from a transmission axis of the first polarization layer.

18. A system for selectively obscuring a user's vision, the system comprising:
    a head position detection element for detecting a position of the user's head;
    eyewear having variably transmittive lenses; and
    a controller configured to receive user head position information from the head position
    detection element comprising information regarding an up and down position of the user's head relative to a predetermined point in space in front of the user and further configured to control the transmittivity of the lenses based on user head position information by varying an electrical signal applied to the lenses, wherein the system is further configured to receive aircraft altitude information and wherein the system is configured to increase the transmittivity to lighten the lenses and thereby not obscure the user's vision when the aircraft altitude information indicates that the aircraft is below a predetermined altitude.

19. The system of claim 18, wherein the predetermined point in space is at a border between a windscreen and an instrument panel of an aircraft.

20. The system of claim 18, further comprising:
    a gaze direction detection element for detecting a direction of the user's gaze;
    wherein the controller is further configured to receive user gaze direction information from the gaze direction detection element and further configured to control the transmittivity of the lenses based on the user head position information and the gaze direction information.

21. The system of claim 18, wherein each variably transmittive lens comprises two stacked variable attenuation optical cells sandwiching a half-wave plate, and
    wherein each optical cell comprises (1) a transparent substrate, (2) an optically transparent electrically conductive layer on the substrate, (3) a transmissive type twisted nematic liquid crystal polymer layer on the electrically conductive layer, (4) a first linear polarization layer on the substrate opposite the electrically conductive layer, and (5) a second linear polarization layer on the liquid crystal polymer layer, the second polarization layer having a transmission axis oriented 90 degrees apart from a transmission axis of the first polarization layer.

* * * * *